US011349891B1

(12) United States Patent
Mishra et al.

(10) Patent No.: US 11,349,891 B1
(45) Date of Patent: May 31, 2022

(54) HYBRID STATIC AND DYNAMIC MULTICAST CONFIGURATION FOR MEDIA SERVING ENVIRONMENT

(71) Applicant: Cisco Technology, Inc., San Jose, CA (US)

(72) Inventors: Mankamana Prasad Mishra, San Jose, CA (US); Rajiv Asati, Morrisville, NC (US); Nitin Kumar, San Jose, CA (US); Luc De Ghein, Deinze (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/220,153

(22) Filed: Apr. 1, 2021

Related U.S. Application Data

(63) Continuation of application No. 17/195,948, filed on Mar. 9, 2021, now abandoned.

(51) Int. Cl.
*H04L 65/611* (2022.01)
*H04L 65/60* (2022.01)

(52) U.S. Cl.
CPC .......... *H04L 65/4076* (2013.01); *H04L 65/60* (2013.01)

(58) Field of Classification Search
CPC ......... H04N 21/44204; H04N 21/6582; H04N 21/6405; H04N 21/4516; H04N 21/44222;
(Continued)

(56) References Cited

U.S. PATENT DOCUMENTS 11,115,329 B1 * 9/2021 Mishra .................... H04L 45/34
2007/0268899 A1 11/2007 Cankaya
(Continued)

FOREIGN PATENT DOCUMENTS

CN 111669617 9/2020

OTHER PUBLICATIONS

Menkovski, et al, "Machine Learning approach for Quality of Experience aware networks" published 2010, 2010 International Conference on Intelligent Networking and Collaborative Systems, Electrical Engineering Department, Eindhoven University of Technology, 6 pages.
(Continued)

*Primary Examiner* — Oanh Duong
(74) *Attorney, Agent, or Firm* — Lee & Hayes, P.C.

(57) ABSTRACT

This disclosure describes techniques for configuring an edge router of a communication provider network, the edge router coupled to communicate with a plurality of media streaming playback devices. Based at least in part on an indication of characteristics associated with the plurality of media streaming playback devices, a first multicast join for the edge router is configured to the communication provider network such that one or more media servers delivers a first plurality of media streams to the edge router via the communication provider network. Based at least in part on an indication of a request for an additional media stream not included in the first plurality of media streams, a second multicast join for the edge router is configured to the communication provider network such that the one or more media servers delivers the additional media stream to the edge router via the communication provider network.

20 Claims, 6 Drawing Sheets

(58) Field of Classification Search
CPC .......... H04N 21/25883; H04L 65/4076; H04L 65/60
See application file for complete search history.

(56) References Cited

U.S. PATENT DOCUMENTS

| | | | | |
|---|---|---|---|---|
| 2009/0025025 | A1* | 1/2009 | Vleck | H04N 21/44213 725/14 |
| 2010/0095347 | A1* | 4/2010 | Chase | H04L 12/185 725/151 |
| 2011/0103374 | A1* | 5/2011 | Lajoie | H04L 65/4076 370/352 |
| 2012/0278898 | A1* | 11/2012 | Nguyen | G06F 21/10 726/27 |
| 2013/0061259 | A1* | 3/2013 | Raman | H04H 60/32 725/14 |
| 2013/0097309 | A1* | 4/2013 | Ma | H04L 67/2847 709/224 |
| 2016/0323343 | A1* | 11/2016 | Sanghavi | H04L 65/602 |
| 2018/0359506 | A1 | 12/2018 | Hodge et al. | |
| 2019/0028775 | A1* | 1/2019 | Chakra | H04L 65/4076 |
| 2020/0267425 | A1 | 8/2020 | Liu et al. | |
| 2020/0358707 | A1* | 11/2020 | Farrow | H04L 65/4076 |

OTHER PUBLICATIONS

"Preserving Video Quality in IPTV Networks" 2008 Cisco Systems, Inc. white paper; retrieved from cisco.com; 18 Pages.

* cited by examiner

HYBRID STATIC AND DYNAMIC MULTICAST CONFIGURATION FOR MEDIA SERVING ENVIRONMENT

RELATED APPLICATIONS

This application is a continuation of and claims priority to U.S. patent application Ser. No. 17/195,948, filed Mar. 9, 2021, titled "HYBRID STATIC AND DYNAMIC MULTICAST CONFIGURATION FOR MEDIA SERVING ENVIRONMENT," the entirety of which is incorporated herein by reference.

TECHNICAL FIELD

The present disclosure relates generally to network-based media stream serving and, more specifically, to techniques to optimize response time to media stream requests originating from client devices.

BACKGROUND

Media streams may be served to client devices such as to set-top boxes. Example media streams correspond to various television channels. The media streams may be, for example, media of the various live streamed television channel content served to the client devices using Internet Protocol such that the television channel content is served simultaneously to multiple client devices. Some variants of such a configuration are known as IPTV.

An IPTV service commonly uses one or more multicast protocols to effect one or more media servers transmitting television channel and/or other media content simultaneously to multiple client devices. In some examples, the endpoints for the multicast transmission are provider edge routers that each serve multiple client devices, and the provider edge routers serve client devices over an area network. The provider edge routers serving the client devices over an area network may be referred to as egress provider edge routers, since the egress provider edge routers are where multicast media streams egress from a communication provider network. For example, for a particular stream of media content, the media server head end may transmit the stream once to one or more subscribing egress provider edge routers. The egress provider edge router may provide the stream of media content to client devices that request or otherwise subscribe to it.

In some example configurations, in response to a client device requesting a particular stream of media content (for example, a user of the client device operates a button on a remote control to "change the channel" of television programming), the egress provider edge router to which the requesting client device is coupled for using the IPTV service sends a multicast join for the requested particular media stream. This results in processing of the multicast join for an appropriate data-centric multicast distribution tree (data MDT) to be built. The processing may include the egress provider edge router sending the multicast join message to a provider edge router to which the one or more media servers is coupled via an area network. The provider edge router to which the one or more media servers is coupled via an area network is referred to as an ingress provider edge router, since the ingress provider edge routers are where multicast media streams enter into the communication provider network. The ingress provider edge router then undertakes processing to originate the requested media stream from the one or more media servers. The one or more media servers begin to send the requested media stream toward the ingress provider edge router. Furthermore, the egress provider edge router joins an underlay multicast tree hop by hop through the communication provider network, towards the ingress provider edge router. Then, the multicast traffic begins to flow from the ingress provider edge router towards the egress provider edge router along the underlay multicast tree. When the multicast traffic, including the requested media stream, reaches the egress provider edge router, the egress provider edge router can then direct the requested media stream to the requesting client device.

All of this processing and data travel time may take place in response to a client device requesting a particular stream of television content, such as resulting from a user of the client device operating a button on a remote control to "change the channel." In some examples, the processing to set up the multicast and also for the media stream data to begin travelling from the one or more media servers towards and reaching the requesting client device may take between five and thirty seconds, and the duration may depend on the number of routers and other platforms in the communication provider network. During this processing, a display portion of the client device (such as a display monitor connected to a set-top box) may display a blank screen, which can be very annoying to users, particularly to users who pay the IPTV service provider for a premium level of service.

For example, when a multicast tree is built, signaling may happen in two parts. First, with overlay signaling, overlay signaling may be used to carry some information about the multicast tree to join. Overlay signaling itself may carry multiple types of information (such as unicast and multicast), so this can add delay. Furthermore, after the overlay signaling, a last hop router may be aware of which multicast tree to join. Thereafter, underlay signaling may include hop by hop signaling to create an actual tree. These steps can cause delay.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
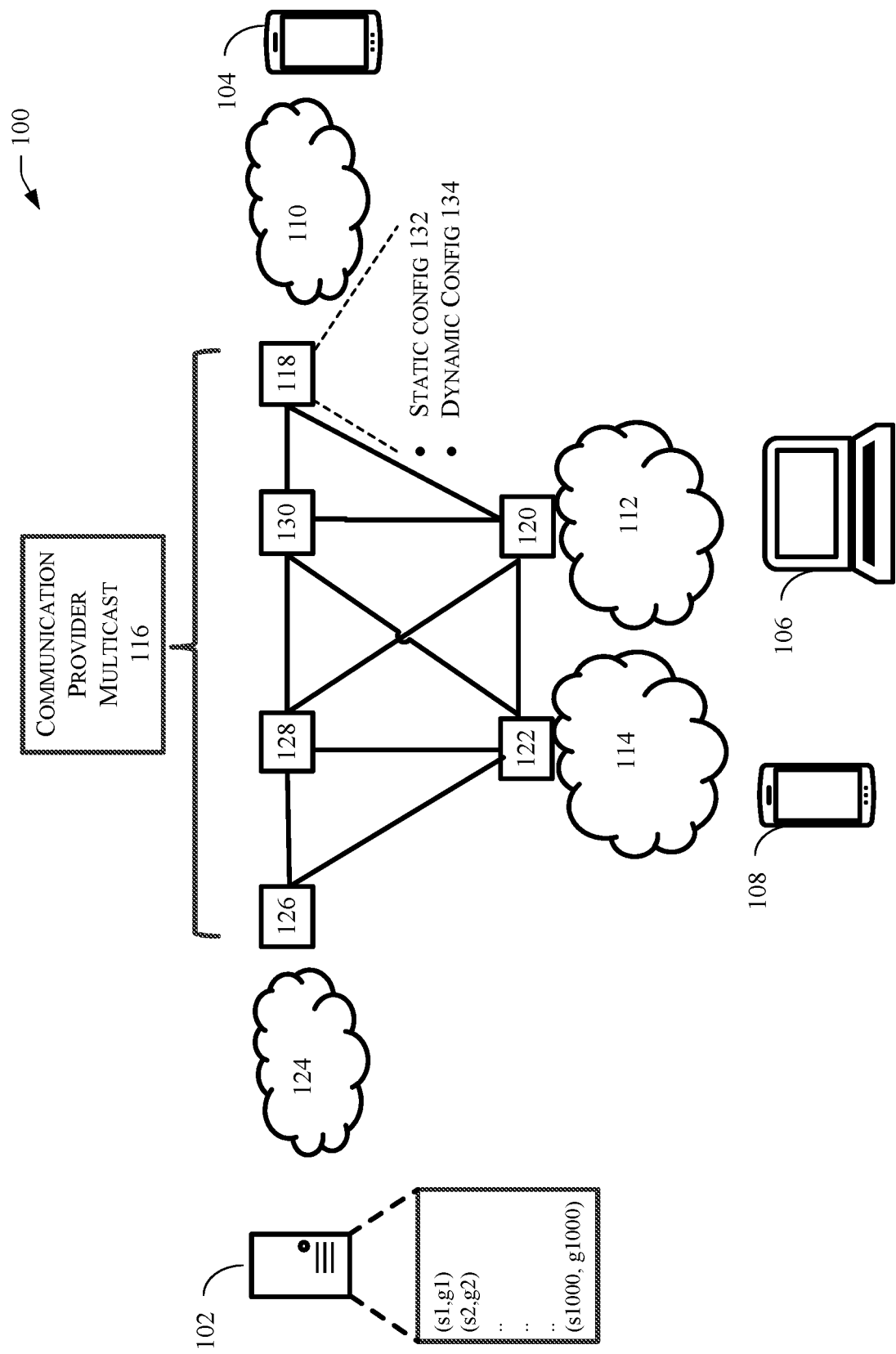
FIG. 1 is a system diagram illustrating an example system in which a media server may provide a plurality of media streams to subscribing client devices corresponding to a static multicast configuration and a dynamic multicast configuration.

This disclosure describes techniques for configuring an edge router of a communication provider network, the edge router coupled to communicate with a plurality of media streaming playback devices. The techniques include, based at least in part on an indication of characteristics associated with the plurality of media streaming playback devices, configuring a first multicast join for the edge router to the communication provider network such that one or more media servers delivers a first plurality of media streams to the edge router via the communication provider network. The techniques further include, based at least in part on an indication of a request, by at least one of the plurality of media streaming playback devices, for an additional media stream not included in the first plurality of media streams, configuring a second multicast join for the edge router to communication network such that the one or more media servers delivers the additional media stream to the edge router via the communication provider network.

Additionally, the techniques described herein may be performed by a system and/or device having non-transitory computer-readable media storing computer-executable instructions that, when executed by one or more processors, performs the methods described herein.

Example Embodiments

In some examples, a technique to address the delay that would otherwise occur when a client device requests a particular media stream not already being provided to the client device includes proactively applying, for each egress provider edge router, a static configuration that includes all or a substantial subset of the media streams that the one or more media servers may provide. As a result, all or the substantial subset of the media streams are provided to the egress provider edge routers, including even media streams that a client device has not requested. Furthermore, when a client requests a particular stream of media content, that particular stream of media content is readily available from the egress provider edge router without all of the processing that might otherwise occur. This static configuration may be considered a default MDT, in which all provider edge routers are connected together for one virtual private network (VPN) with multicast enabled. In some examples, the default MDT can be built as a full mesh of multicast trees.

A benefit of having a default MDT that connects provider edge routers for one multicast-enabled VPN is that this facilitates protocol independent multicasting (PIM) signaling in overlay. The default MDT is always "on." As a result, all protocol edge routers are directly connected multicast-wise via the default MDT across the communication provider network (typically a Multiprotocol Label Switching, or MPLS, core). All PE routers become PIM neighbors in one virtual routing and forwarding (VRF) network on the default MDT. As PIM neighbors, the PE routers can send and receive PIM control messages (e.g., joins and prunes) across the default MDT. In this sense, the default MDT is like a local area network (LAN) for PIM. The Default MDT may be configured to always carry all PIM control message (such as PIM hellos, joins and prunes). In addition, by default, the default MDT may also carry customer multicast (C-multicast) traffic.

With the default MDT, since all media streams are always provided to all egress provider edge routers, certain "on demand" processing may be avoided in response to a media stream request, such as the egress provider edge router sending a multicast join message to an ingress provider edge router. The processing that may be avoided may also include the ingress provider edge router undertaking processing to originate the requested media stream from the one or more media servers. The processing that may be avoided may also include the one or more media servers beginning to send the requested media stream toward the ingress provider edge router. The processing that may be avoided may also include the egress provider edge router joining an underlay multicast tree hop by hop through the communication provider network, towards the ingress provider edge router. After all this processing, which may be avoided by proactively providing all or a substantial subset of the media streams to the egress provider edge routers using a default MDT, the multicast traffic begins to flow from the ingress provider edge router towards the egress provider edge router along the underlay multicast tree.

Thus, for example, in the absence of a default MDT, when a client device requests a particular stream of media content, the time during which a display portion of the client device (such as a display monitor connected to a set-top box) may display a blank screen may be minimized or eliminated. With a default MDT, any requested media stream is always available at the egress provider edge router to which the client device requesting the media stream is coupled.

However, in many situations, many of the media streams the one or more media servers provide to the egress provider edge routers may never be requested by client devices coupled to the egress provider edge routers. For example, a particular IPTV service provider may provide one thousand or more media channels. On the other hand, a particular egress provider edge router may need to provide half, or even less, of the one thousand or more media channels to requesting client devices. The use of a default MDT thus may result in a lot of operational overhead to avoid having display portions of client devices from displaying a blank screen when requesting a media stream. The operational overhead may include bandwidth consumption to provide many media streams that are never requested by client devices. The operational overhead may also include computational and messaging bandwidth overhead for configuring the multicast trees to provide many media streams that are never requested by the client devices. In addition, the many egress provider edge router devices may each have to have sufficient computational power and memory to maintain a configuration for all of the one thousand or more media channels, even for the media channels that are not requested by client devices. Such overhead may be tolerable for relatively smaller IPTV services, with a relatively small number of subscribers and that provide relatively smaller number of media channels. But this approach may not scale, because the overhead may become intolerable as the number of subscribers and/or the number of media channels provided increases.

In another approach, the IPTV system may be configured such that individual egress provider edge routers or groups of egress provider edge routers each operate according to a static multicast configuration of media streams, according to a data MDT, such that media streams provided that egress edger router or group of egress provider edge routers are determined to be appropriate to client devices coupled to receive media streams via that egress provider edge router or group of egress provider edge routers. In this way, the likelihood is increased that a collection of media streams provided to any one egress provider edge router matches the medias streams that will be requested by client devices coupled to receive media streams via that egress provider edge router.

It may be useful to determine a collection of media streams to provide to an egress provider edge router or group of egress provider edge routers, including changing the collection over time, to increase the likelihood the system will not have to respond to a channel change request from a requesting client device by modifying the configuration of media streams provided to the egress provider edge router or group of egress provider edge routers. It is challenging to determine which media streams are appropriate to client devices coupled to receive media streams via a particular egress provider edge router or group of provider edge routers, let alone to determine how to change the collection of media streams over time. It is generally not obvious how to determine which media streams are likely to be requested by client devices, particularly on an egress provider edge router by egress provider edge router basis, to increase the likelihood the system will not have to respond to a channel change request from a requesting client device by modifying the configuration of media streams provided to the egress provider edge router or group of egress provider edge routers.

In accordance with techniques described herein, a process may determine which media streams to provide to an egress provider edge router or group of egress provider edge routers by determining which media are likely to be requested by client devices coupled to an egress provider edge router or group of egress provider edge routers, where determining which media are likely to be requested by the client devices coupled to the egress provider edge router or the group of egress provider edge routers is based at least in part on an indication of characteristics collectively associated with the client devices. For example, the characteristics may include a pattern of past media stream requests by the client devices, collectively, and/or by other client devices that collectively have characteristics similar to the client devices. The pattern of past media stream requests may include an indication of the media stream (e.g., a "channel") and/or an indication of content of a requested media stream (e.g., a "program).

Determining which media are likely to be requested by the client devices coupled to the egress provider edge router or the group of egress provider edge routers may also be based at least in part on a demographic of users of the client devices and/or a geography (e.g., town, region, etc.) in which the client devices are located. Other considerations may include a time and/or date, which may be input into determining the pattern of past media stream requests, such as by examining past media stream requests that occurred at a similar time of day or a similar day of the week. Yet other considerations may include available special programming, such as special programming that may have universal appeal or that may be adjudged or demonstrated to have appeal to users of client devices located in a particular geography or to users of client devices exhibiting certain demographic characteristics.

Furthermore, while it may be possible to determine with a high degree of certainty which media streams are likely to be requested by the client devices coupled to the egress provider edge router or the group of egress provider edge routers, it would typically not be efficient to increase the certainty by including media streams for which there is only a low likelihood of being requested by a client device. In situations in which a client device requests a media stream not included in the static configuration, the provider edge router to which the client device is coupled may dynamically join the multicast group corresponding to the requested media stream.

The system may refresh the static configuration of media streams being provided to each egress provider edge router or group of egress provider edge routers, using updated values for the indication of characteristics collectively associated with the client devices. For example, the updated characteristics may include an updated pattern of past media stream requests by the client devices, collectively, and/or by other client devices that collectively have characteristics similar to the client devices. The system may also consider, for example, that the date and/or time of day has changed and/or that different special programs are currently available. The system may refresh the static configuration of media streams being periodically, for example, or in response to an observation that an egress provider edge router is making more than a threshold number of dynamic multicast group joins, to account for client devices requesting media streams not included in the current static configuration.

In some examples, the system processes the characteristics of client devices and other data, such as special programs and demographics of users, with machine learning. For example, the machine learning may learn that patterns of such characteristics of client devices, and other data, have generally resulted in particular groups of requested media streams being requested by the client devices. Based on this learning, the machine learning may match future patterns to determine a static configuration of media streams to utilize.

Furthermore, a client device may dynamically request a media stream not available to an egress provider edge router in accordance with the static configuration. In this situation, the egress provider edge router may send a multicast join in order to supplement the multicast tree such that the requested media stream is provided via the appropriate ingress provider edge router to the egress provider edge router that received the media stream request from the client device. The client device may display a blank screen while the multicast tree is supplemented and the requested media stream is provided from the media source, to a ingress provider edge router and across the communication provider network.

FIG. 1 is a system diagram illustrating an example system 100 in which a media server 102 may provide a plurality of media streams to subscribing client devices, including the client device 104, the client device 106 and the client device 108. Each of the client device 104, the client device 106 and the client device 108 may execute a corresponding media streaming client application. Furthermore, each of the client device 104, the client device 106 and the client device 108 may have an incorporated or otherwise associated respective display portion and input portion. In some examples, the input portion may be combined with the display portion, such as a touch screen. The input portion is configured to accept a media stream request from a user of the client device.

Each of the client device 104, the client device 106 and the client device 108 are coupled to a respective media provider multicast network. The client device 104 is coupled to the media provider multicast network 110. The client device 106 is coupled to the media provider multicast network 112. The client device 108 is coupled to the media provider multicast network 114. While FIG. 1 shows only a small number of client devices for simplicity, some examples may have thousands, hundreds of thousands or even millions of client devices. Furthermore, while FIG. 1 shows only a small number of media provider multicast networks, some examples may have hundreds or thousands, or even more, media provider multicast networks.

Each of the media provider multicast network 110, the media provider multicast network 112 and the media provider multicast network 114 are coupled to a communication provider multicast network 116 via at least one respective egress provider edge router. The media provider multicast network 110 is coupled to the communication provider multicast network 116 via the egress provider edge router 118. The media provider multicast network 112 is coupled to the communication provider multicast network 116 via the egress provider edge router 120. The media provider multicast network 114 is coupled to the communication provider multicast network 116 via the egress provider edge router 122.

While FIG. 1 shows each of the media provider multicast network 110, the media provider multicast network 112 and the media provider multicast network 114 coupled to the communication provider multicast network 116 connected by a single egress provider edge router, some examples may have each of at least some of the media provider multicast networks coupled to the communication provider multicast network by multiple egress provider edge routers.

Referring still to FIG. 1, the media server 102 (or, in some examples, a plurality of media servers) is coupled to the media provider multicast network 124. The media provider multicast network 124 is coupled to the communication provider multicast network 116 via an ingress provider edge router 126. In examples in which a plurality of media servers are provided, each media server may be coupled to a same media provider multicast network as another media server or may be coupled to a different media provider multicast network as another media server. Furthermore, while FIG. 1 shows the media provider multicast network 124 is coupled to the communication provider multicast network 116 via the single ingress provider edge router 126, some examples may have the media provider multicast network 124 being coupled to the communication provider multicast network 116 via multiple ingress provider edge routers.

The communication provider multicast network 116 also includes two interior routers, the interior router 128 and the interior router 130. In some examples, a communication provider multicast network has many more interior routers and/or many more provider edge routers.

The provider edge router 126 may be referred to as an ingress provider edge router, since the provider edge router 126 provides an ingress point to the communication provider multicast network 116 for media streams provided from the media server 102. The provider edge router 118, the provider edge router 120 and the provider edge router 122 may be referred to as egress provider edge routers, since the provider edge router 118, the provider edge router 120 and the provider edge router 122 each provide an egress point from the communication provider multicast network 116 for media streams provided from the media server 102.

As also shown in FIG. 1, the egress provider edge router 118 is configured with a static configuration 132 and a dynamic configuration 134. The static configuration 132 is based on a determination of which media streams are likely to be requested by the client device 104 and other client devices coupled to the egress provider edge router 118, where determining which media streams are likely to be requested by the client devices coupled to the media provider multicast network 110 based at least in part on an indication of characteristics collectively associated with the client device 104 and the other client devices coupled to the media provider multicast network 110. While FIG. 1 illustrates the egress provider edge router 118 is configured with the static configuration 132 and the dynamic configuration 134, other egress provider edge routers may also be configured with a static configuration and a dynamic configuration.

The dynamic configuration 134 may be based on a client device dynamically requesting a media stream not available to the egress provider edge router 118, such as the requested media stream not being in accordance with the static configuration 132 and/or not being in accordance with a previous dynamically requested media stream.

Figure 2:
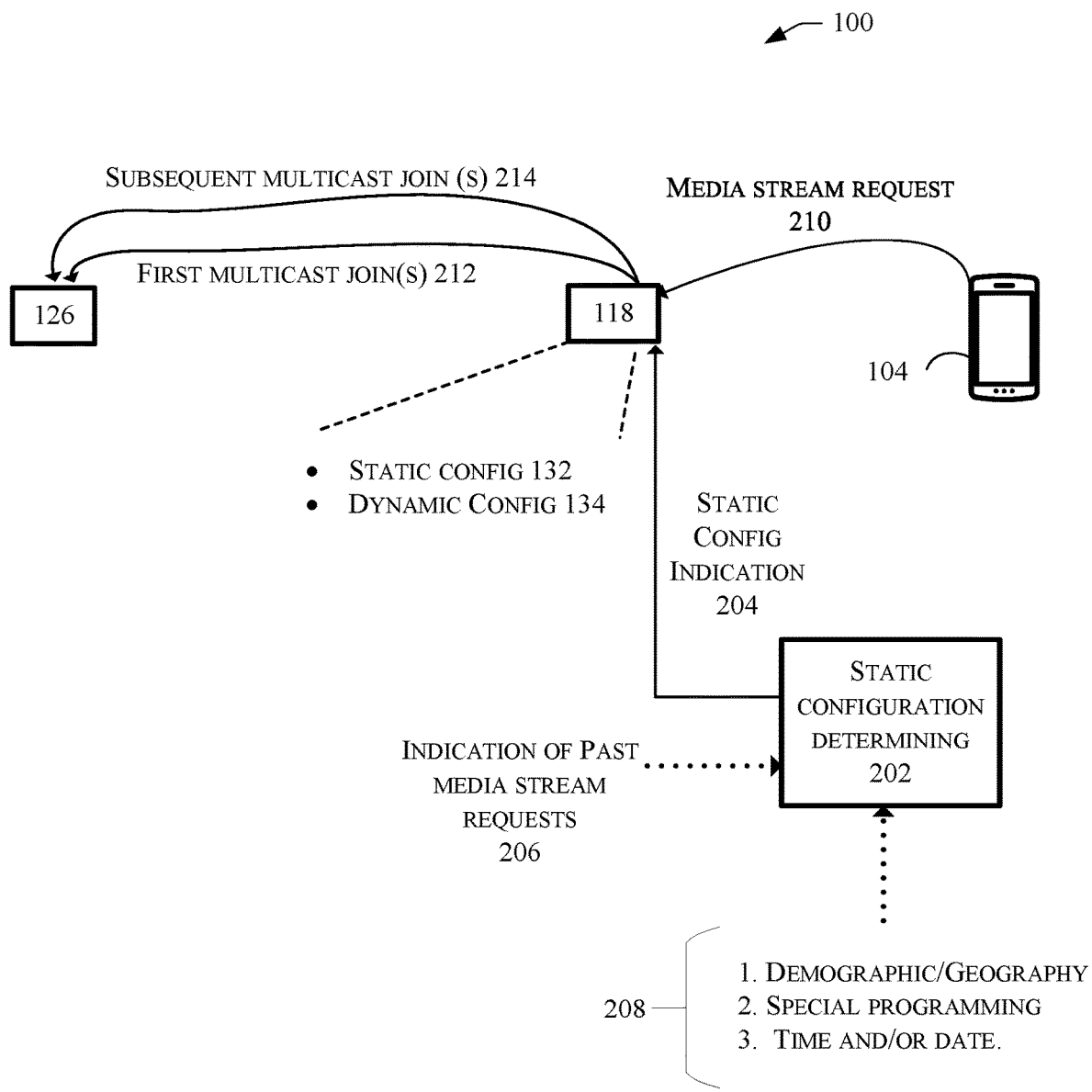
FIG. 2 is a diagram illustrating an example of how the static multicast configuration and the dynamic multicast configuration may be determined.

FIG. 2 illustrates in greater detail an example of how the static configuration 132 and the dynamic configuration 142 may be determined. FIG. 2 is a simplified version of the FIG. 1 system 100, with some components of the FIG. 1 system 100 omitted from FIG. 2 for ease of illustration. Referring to FIG. 2, the egress provider edge router 118 interoperates with a static configuration determining unit 202. The static configuration determining unit 202 is configured to generate a static configuration indication 204 from which the egress provider edge router 118 may determine the static configuration 132. The static configuration determining unit 202 may be a device or incorporated into a device separate from the egress provider edge router 118, may be incorporated into the egress provider edge router 118 or may be a software or firmware module being executed by the egress provider edge router 118 along with other functionality, such as router functionality, of the egress provider edge router 118.

The static configuration determining unit 202 may, for example, process an indication of past media stream requests 206. The indication of past media stream requests 206 may include data regarding past media stream requests originating from the client device 104 and/or other client devices coupled to the egress provider edge router 118 as well as past media stream requests originating from other client devices, coupled to other egress provider edge routers 118. The static configuration determining unit 202 may, for example, discern a pattern in the past media stream requests 206 and, based thereon, predict what media stream requests may originate from the client device 104 and/or other client devices coupled to the egress provider edge router 118. In some examples, the static configuration determining unit 202 may be configured to predict, with some predetermined level of probability, what media stream requests may originate from the client device 104 and/or other client devices coupled to the egress provider edge router 118.

Furthermore, the static configuration determining unit 202 may process other information 208, which may include, for example, demographic and/or geography information corresponding to subscribers/users of the client device 104 and/or other client devices coupled to the egress provider edge router 118. This demographic and/or geography information may be relevant to determining, with the predetermined level of probability, what media stream requests may originate from the client device 104 and/or other client devices coupled to the egress provider edge router 118.

As for the dynamic configuration 134, based at least in part on the egress provider edge router 118 receiving a media stream request 210 from the client device 104 for a media stream which the network 100 is not already configured or configuring to provide to the egress provider edge router 118, the egress provider edge router 118 generates and/or updates the dynamic configuration 134 to include the media stream indicated by the media stream request 210. The egress provider edge router 118 generates and/or updates the dynamic configuration 134 based at least in part on the egress provider edge router 118 receiving a media stream request from a client device, other than the client device 104, for a media stream which the network 100 is not already configured or configuring to provide to the egress provider edge router 118, the egress provider edge router 118 generates and/or updates the dynamic configuration 134 to include the media stream indicated by the media stream request.

Based at least in part on the static configuration 132, the egress provider edge router 118 may send one or more multicast joins 212 to configure the communication provider multicast network 116 and the media server 102 to provide to the egress provider edge router 118, as a multicast group subscriber, one or more media streams corresponding to the static configuration 132. For example, the network 100 may form a data MDT, to cause only media streams indicated in the static configuration 132 to be delivered to the egress provider edge router 118. Other egress provider edge routers may also send one or more multicast joins, to configure the communication provider multicast network and appropriate media servers to cause media streams indicated by static configurations of those respective egress provider edge routers to be provided to those respective egress provider edge routers.

Regarding the media stream request 210 received by the egress provider edge router 118, the egress provider edge router 118 may send a subsequent multicast join 214 in order to form a multicast tree such that the media stream indicated by the media stream request 210 is provided via the appropriate ingress provider edge router to the egress provider edge router 118, to be provided to the client device 104. The client device 104 may display a blank screen while the multicast tree for providing the requested media stream is formed and the requested media stream is provided from the media source, to an ingress provider edge router and across the communication provider network. The dynamic configuration 134 may be a plurality of dynamic configurations, each corresponding to a different media stream request from the client device 104 and the other client devices coupled to the media provider multicast network 110.

The number of channel change requests that result in changing the dynamic configuration 134, and resulting in one or more subsequent multicast joins 214, is expected to be limited. This is due to the static configuration determining unit 202 processing the indication of past media stream requests 206 and/or other information 208 to generate the static configuration 204 that corresponds, with some predetermined level of probability, to the media stream requests that may originate from the client device 104 and/or other client devices coupled to the egress provider edge router 118. For example, a media stream indicated in a media stream request 208 is likely, with some predetermined level of probability, to be already accounted for in the static configuration indication 204.

Figure 3:
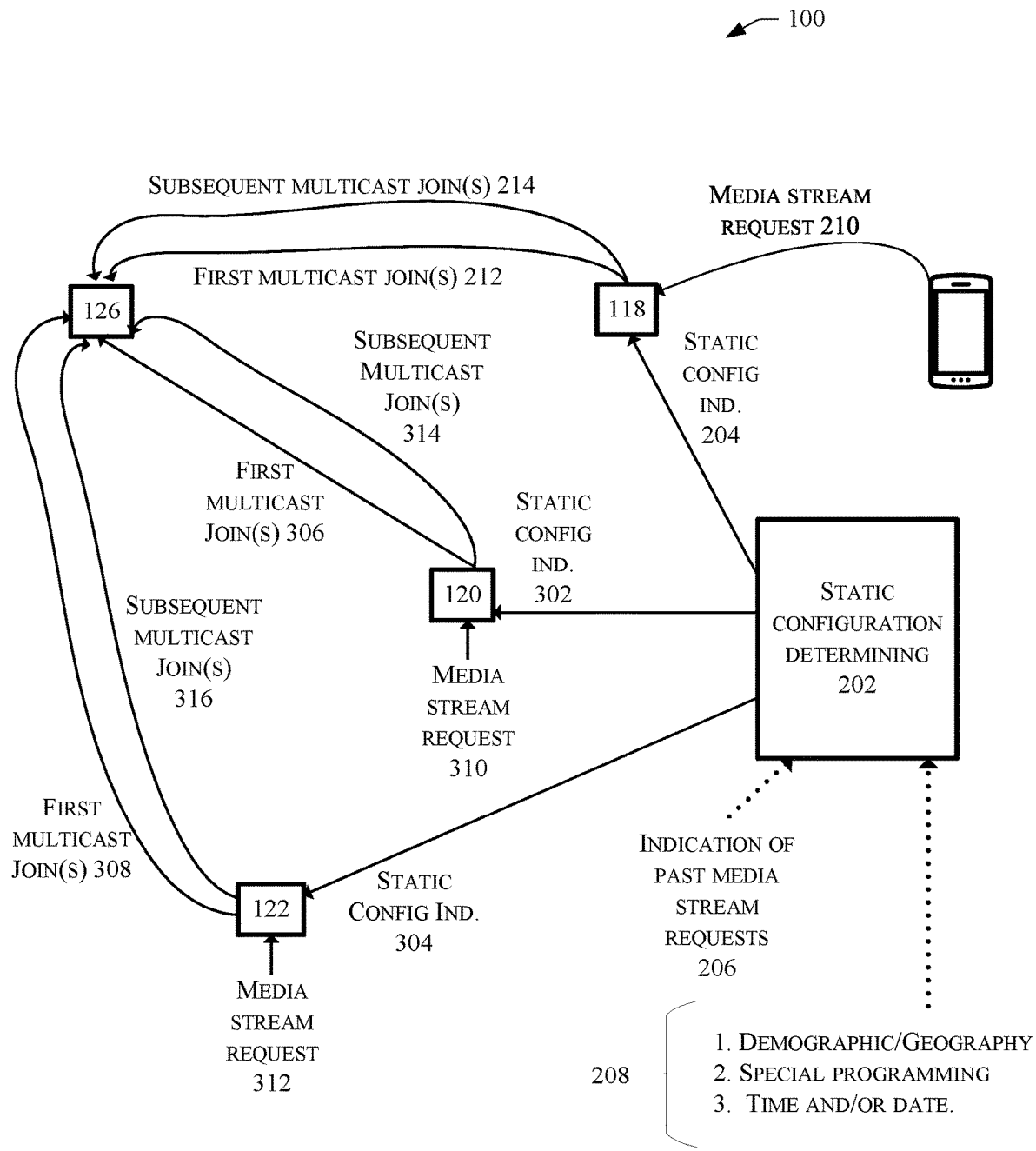
FIG. 3 illustrates the example system of FIG. 1 in a configuration in which to determine a static configuration indication for each of a plurality of egress provider edge routers.

FIG. 3 illustrates the system 100 in a configuration in which the static configuration determining unit 202 is configured to determine, in addition to the static configuration indication 204, a static configuration indication 302 and a static configuration indication 304. The static configuration determining unit 202 provides the static configuration indication 302 to the egress provider edge router 120, and the static configuration determining unit 302 provides the static configuration indication 304 to the egress provider edge router 122.

The indication of past media stream requests 206 that the static configuration determining unit 202 processes may include an indication of past media stream requests 206 made not only by client devices coupled to the egress provider edge router 118, but the indication of past media stream requests 206 may also include an indication of past media stream requests made by client devices, such as the client device 106, coupled to the egress provider edge router 120 and an indication of past media stream requests made by client devices, such as the client device 108, coupled to the egress provider edge router 122.

Also, the other data 208, such as demographic/geography data, special programming date and time and/or date data, may include data that corresponds to the egress provider edge router 118 and client devices coupled to the egress provider edge router 118. The other data 208 may also include data that corresponds to the egress provider edge router 120 and client devices, such as the client device 106, coupled to the egress provider edge router 120. The other data 208 may also include data that corresponds to the egress provider edge router 122 and client devices, such as the client device 108, coupled to the egress provider edge router.

For example, each of the egress provider edge router 118, the egress provider edge router 120 and the egress provider edge router 122 may provide information to a centralized data collection of the indication of past media stream requests 206 and the other data that are relevant to the respective one of the egress provider edge router 118, the egress provider edge router 120 and the egress provider edge router 122. The indication of the past media stream requests 206 and the other data 208 may be provided to the static configuration determining unit 202 from the centralized data collection.

The egress provider edge router 118, the egress provider edge router 120 and the egress provider edge router 122 may provide the first multicast join 212, a first multicast join 306 and a first multicast join 308, respectively, to the ingress provider edge router 126, based at least in part on the static configuration indication 204, the static configuration indication 302 and the static configuration indication 304, respectively. Based at least in part thereon, the network 100 may form a data MDT, to cause media streams indicated by the static configuration indication 204 be delivered to the egress provider edge router 118, to cause media streams indicated by the static configuration indication 302 to be delivered to the egress provider edge router 120 and to cause media streams indicated by the static configuration indication 304 to be delivered to the egress provider edge router 122.

Each of the egress provider edge router 118, the egress provider edge router 120 and the egress provider edge router 122 may be configured to receive a media stream request 210, a media stream request 310 and a media stream requests 312, respectively. The media stream request 210 may be provided by a client device coupled to the egress provider edge router 118. The media stream request 310 may be provided by a client device coupled to the egress provider edge router 120. The media stream request 312 may be provided by a client device coupled to the egress provider edge router 122.

Based at least in part on the media stream request 210, the egress provider edge router 118 may send a subsequent multicast join 214 in order to form a multicast tree such that the media stream indicated by the media stream request 210 is provided via the appropriate ingress provider edge router to the egress provider edge router 118, to be provided to the client device that originated the media stream request 210.

Based at least in part on the media stream request 310, the egress provider edge router 120 may send a subsequent multicast join 314 in order to form a multicast tree such that the media stream indicated by the media stream request 310 is provided via the appropriate ingress provider edge router to the egress provider edge router 120, to be provided to the client device that originated the media stream request 310. Based at least in part on the media stream request 312, the egress provider edge router 122 may send a subsequent multicast join 316 in order to form a multicast tree such that the media stream indicated by the media stream request 312 is provided via the appropriate ingress provider edge router to the egress provider edge router 122, to be provided to the client device that originated the media stream request 312.

In some examples, the static configuration determining unit 202 may be use machine learning to generate, based for example on the indication of past media stream requests 206 and additional relevant information 208, rules to determine the static configuration indication 204, the static configuration indication 302 and the static configuration indication 304. For example, the machine learning may discern patterns in the past media stream requests 206 and, based at least in part thereon, predict patterns of future media stream request on which to base the static configuration indication 204, the static configuration indication 302 and the static configuration indication 304. The indication of past media stream requests 206 may be for a particular egress provider edge router to which a static configuration indication corresponds and/or the indication of past media stream requests 206 may include past media stream requests for other egress provider edge routers, other than the provider edge router to which a static configuration indication corresponds.

Figure 4:
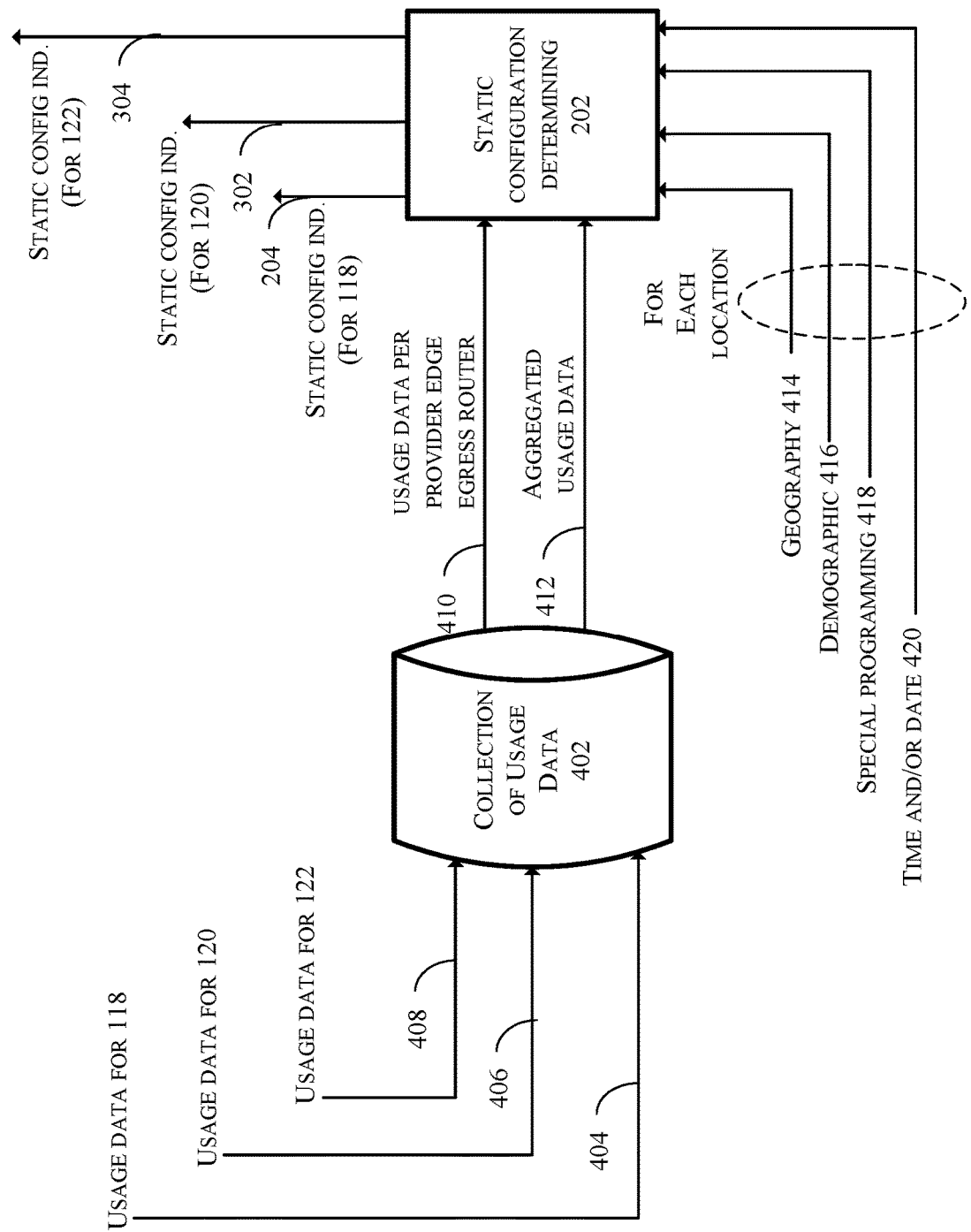
FIG. 4 is a block diagram illustrating detail of data that may be provided to a shared static configuration determining unit.

FIG. 4 is a block diagram illustrating in greater detail data that may be provided to a shared static configuration determining unit 202. In some examples, functionality of the static configuration determining unit 202 is decentralized rather than being shared, such as being part of each of the egress provider edge routers in the network or being provided for each of separate groups of egress provider edge routers in the network. As illustrated in FIG. 4, the indication of past media stream request 206 may include a collection of usage data 402. The collection of usage data 402 may include usage data for each of the egress provider edge routers 118, 120, and 122. For example, the usage data 402 may be separately provided as an indication 404 of usage data for the egress provider edge router 118, as an indication 406 of usage data for the egress provider edge router 120 of and as an indication 408 of usage data for the egress provider edge router 122. The indication 404, the indication 406 and the indication 408 may be stored as at least a portion of the collection of usage data 402.

The static configuration determining unit 202 may receive from the collection of usage data 402 an indication 410 of usage data per egress provider edge router or group of egress provider edge routers for which the static configuration determining unit 202 is configured to provide a static configuration indication. Additionally or alternatively, the static configuration determining unit 202 may receive from the collection of usage data 402 an indication 412 of aggregated usage data, aggregated for egress provider edge routers for which the static configuration determining unit 202 is configured to provide a static configuration.

For example, a past pattern of media stream usage data for a particular edge router may be a good indicator of what media streams are likely to be requested in the future by client devices coupled to receive media streams via the particular edge router. For example, if a particular media stream has been requested by a large number of client devices coupled to receive media streams via the particular edge router, this may be good indicator that the particular media stream has a higher probability of being requested again in the future. As another example, if a particular media stream has never been requested by a client device coupled to receive media streams via the particular edge router, this may be a good indicator that the particular media stream has a lower probability of being requested in the future.

In some examples, some client devices have associate levels of service, sometimes known as "quality of service" (QoS). For example, some client devices may have associated users who have paid varying amounts of money for an expectation of various QOS levels, such as a "Platinum Customer" who pays high premium and expects QoS and experience to be high. For example, an end user expectation of a Platinum Customer may be for the service provider to provide a mechanism where when user changes between two IPTV channel, service on the new channel should start without any blue screen. Other paying levels of customers may include a "Gold Customer" and a "Silver Customer, where the Gold Customer has a lower expectation than a Platinum Customer and a Silver Customer has a lower expectation than a Gold Customer. A "Free Air" customer may pay nothing and only have an expectation of best effort service.

In some examples, the static configuration determining unit 202 may give a higher weight to usage data 410 and usage data 412 resulting from usage by higher-QoS customers. For example, the static configuration determining unit may give a highest weight to usage by a Platinum Customer, less weight to usage by a Gold Customer, yet less weight to usage by a Silver Customer, and little or no weight to usage by a Free Air customer.

The static configuration determining unit 202 may also receive, for each of the egress provider edge router 118, the egress provider edge router 120 and the egress provider edge router 122, an indication of geography 414, and indication of demographic 416 of subscribers using client devices coupled to the respective egress provider edge router, an indication of special programming 418 available to be delivered via the respective egress provider edge router, and the time and/or date corresponding to associated usage data per egress provider edge router 410 and/or aggregated usage data 412.

For example, the static configuration determining unit 202 may be configured to predict, at a higher probability, that client devices in a particular geography will request a media stream that includes a sporting event having a team located in or near that particular geography. In some examples, a particular geography may be associated with users who speak a particular language and/or who speak a particular dialect, and the static configuration determining unit 202 may be configured to predict, at a higher probability, that client devices located in the particular geography may request media streams that include programming in that particular language and/or that particular dialect.

The static configuration determining unit 202 may be configured to predict, at a higher probability, that client devices will request media streams that include special programming predicted to have high level of viewership generally, such as award events or national championship games. In some examples, the static configuration determining unit 202 may be configured to predict, at a higher probability, that that client devices will request programming appropriate to a particular time and/or date. For example, seasonal programming may be more popular, such as Christmas programs during the winter holiday season.

The aggregate usage data 412 may be useful to influence a static configuration indication for a particular egress provider edge router or group of egress provider edge routers, since programming or media streams that are popular generally (or are unpopular generally) may be popular (or unpopular) for a specific group of users.

For example, historical data may indicate that, every Friday at 9 PM, most rural areas have users that watch channel "X" which is denoted by (S,G). Based on this analysis, before Friday at 9 PM, channel "X" may be made available by applying a static join. The historical data may further indicate that many (or even most) people leave channel "X" after 10 PM, so it may be removed after 10 PM. Many countries may have local channels per geographic location, and each location may have different TV channels that are popular. Based on historical data those channels will be subscribed statically before a time at which it becomes popular, as predicted statistically.

Figure 5:
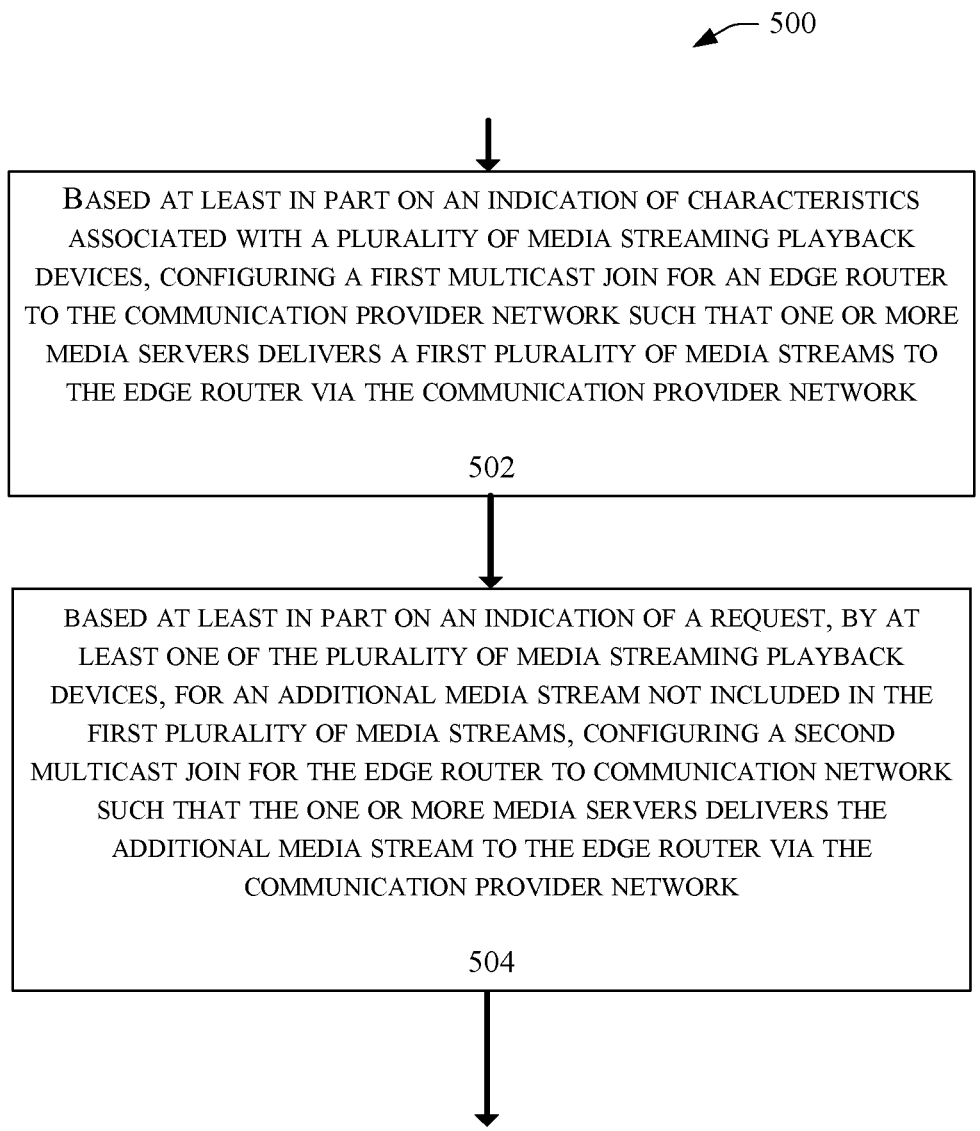
FIG. 5 is a flowchart illustrating a method that may be carried out by an egress provider edge router of a system in which one or more media servers may provide a plurality of media streams to subscribing client devices, including via the egress provider edge router.

FIG. 5 is a flowchart illustrating a method 500 that may be carried out by an egress provider edge router of a system in which one or more media servers may provide a plurality of media streams to subscribing client devices, including via the egress provider edge router. For example, the subscribing client devices may be coupled, via a media provider multicast network and the egress provider edge router, to a communication provider multicast network. The one or more media servers may be coupled to the communication provider multicast network via a communication provider multicast network and an ingress provider edge router. In accordance with the method 500, the egress provider edge router may be configured with a a static configuration and a dynamic configuration. For example, a static configuration determining unit may be configured to predict, with some predetermined level of probability, what media stream requests may originate from the client devices coupled to the egress provider edge router. The dynamic configuration may be based on a client device dynamically requesting a media stream not available to an egress provider edge router, such as the requested media stream not being in accordance with the static configuration and/or not being in accordance with a previous dynamically requested media stream.

At 502, the egress provider edge router configures a first multicast join for the egress provider edge router to a communication provider network. The egress provider edge router configures the first multicast join based at least in part on an indication of characteristics associated with a plurality of media streaming playback devices coupled to receive media streams from the one or more servers via the egress provider edge router. The first multicast join is such that one or more media servers delivers a first plurality of media streams to the edge router via the communication provider network. For example, the egress provider edge router may configure the first multicast join based at least in part on a static configuration indication provided to the egress provider edge router by a static configuration determining unit. The static configuration determining unit may be configured to predict, with some predetermined level of probability, what media stream requests may originate from client devices coupled to the egress provider edge router.

At 504, the egress provider edge router configuring a second multicast join for the egress provider edge router to communication network. The egress provider edger router configures the second multicast join based at least in part on an indication of a request, by at least one of the plurality of media streaming playback devices coupled to receive media streams from the one or more servers via the egress provider edge router, for an additional media stream not included in the first plurality of media streams. The second multicast join is such that the one or more media servers delivers the additional media stream to the egress provider edge router via the communication provider network.

Figure 6:
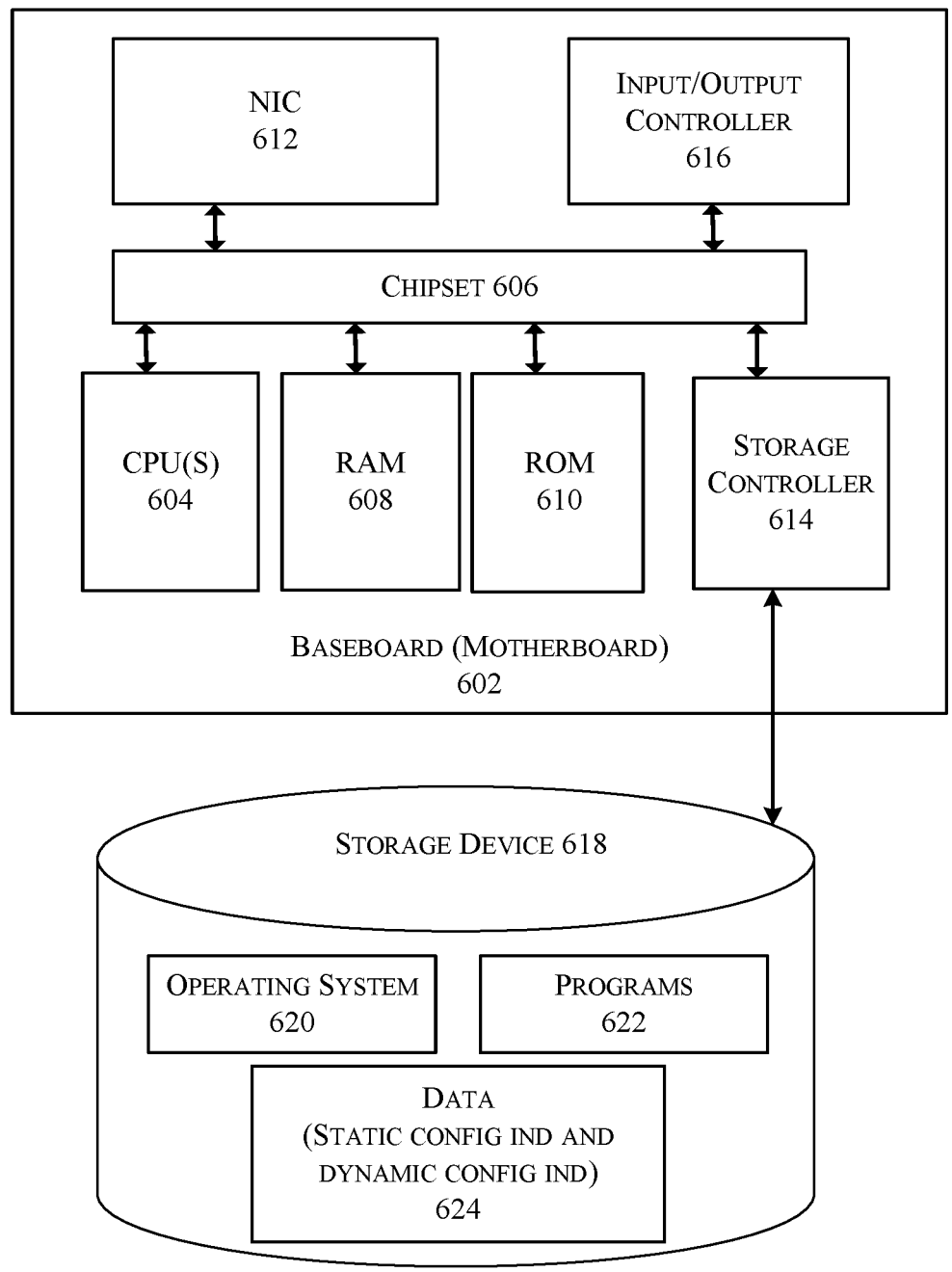
FIG. 6 illustrates an example computer architecture for a computer capable of executing program components for implementing the functionality described herein.

FIG. 6 illustrates an example computer architecture for a computer 600 capable of executing program components for implementing the functionality described above. The computer architecture shown in FIG. 6 illustrates an architecture of a server computer, workstation, desktop computer, laptop, tablet, network appliance, e-reader, smartphone, network switch, or other computing device, and can be utilized to execute any of the software components presented herein. The computer 600 may, in some examples, correspond to a network infrastructure device discussed herein.

The computer 600 includes a baseboard 602, or "motherboard," which may be a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be, for example, standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein. As illustrated in FIG. 6, the ROM 610 or NVRAM can also store data usable by the computer 600 to generate and/or process attestation information in messages exchanged among the computer 600 and other devices. In other examples, this data may be stored elsewhere, such as in RAM 608.

The computer 600 can operate in a networked environment using logical connections to remote computing devices and computer systems through a network. For example, the chipset 606 can include functionality for providing network connectivity through a Network Interface Controller (NIC) 612, such as a gigabit Ethernet adapter. The NIC 612 can connect the computer 600 to other computing devices over a network. It should be appreciated that multiple NICs 612 can be present in the computer 600, connecting the computer to other types of networks and remote computer systems. In some instances, the NICs 612 may include at least one ingress port and/or at least one egress port. An input/output controller 616 may be provided for other types of input/output.

The computer 600 can be connected to a storage device 618 that provides non-volatile storage for the computer. The storage device 618 can store an operating system 620, programs 622, and data 624, for example. The storage device 618 can be connected to the computer 600 through a storage controller 614 connected to the chipset 606. The storage device 618 can include one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The data 624 may include, for example, one or more static configuration indications and one or more dynamic configuration indications. The data 624 may also include, for example, an indication of past media stream requests and/or information regarding demography and/or geography of media stream subscribers, a schedule of programs to be provided on media streams, such as special programming, by time and/or date.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like. For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the storage device 618 described above, the computer 600 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 600.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of configuring an edge router of a communication provider network, the method comprising:
   configuring the edge router to join a first multicast group associated with the communication provider network such that one or more media servers delivers a first plurality of media streams to the edge router via the communication provider network and the edge router delivers the first plurality of media streams to a plurality of media streamlining playback devices;
   receiving an indication of characteristics associated with the plurality of media streaming playback devices;
   determining, based at least in part on the characteristics, a second multicast group from which a media streaming playback device of the plurality of media streaming playback devices is likely to request content; and
   based at least in part on the media streaming playback device being likely to request content from the second multicast group configuring the edge router to join the second multicast group such that the one or more media servers deliver an additional media stream to the edge router via the communication provider network.

2. The method of claim 1, wherein:
the indication of characteristics associated with the plurality of media streaming devices includes an indication of a second plurality of media streams, wherein the second plurality of media streams have been requested in the past by media streaming playback devices coupled to the edge router.

3. The method of claim 1, wherein:
the indication of characteristics associated with the plurality of media streaming devices includes at least one of an indication of at least one of geography associated with the edge router and an indication of demographic characteristics of users of the plurality of media streaming devices.

4. The method of claim 1, wherein:
configuring the first multicast join for the edge router to the communication provider network is further based at least in part on an indication of programming to be provided by the one or more media servers.

5. The method of claim 1, wherein:
configuring the first multicast join for the edge router to the communication provider network is further based at least in part on an indication of a time and/or data associated with the first multicast join.

6. The method of claim 1, wherein:
the edge router is a first edge router;
the plurality of media streaming devices is a first plurality of media streaming devices;
a second edge router is configured to communicate with a second plurality of media streaming devices; and
configuring the first multicast join for the edge router to the communication provider network is further based at least in part on characteristics associated with the second plurality of media streaming devices.

7. The method of claim 1, wherein:
configuring the first multicast join includes processing the indication of characteristics associated with the plurality of media streaming playback devices in view of previous media stream requests originating from the plurality of media streaming playback devices.

8. The method of claim 7, wherein:
processing the indication of characteristics associated with the plurality of media streaming playback devices in view of previous media stream requests originating from the plurality of media streaming playback devices includes applying rules generated at least in part from applying a machine learning process to the previous media stream requests.

9. An edge router of a communication provider network comprising:
one or more processors; and
one or more non-transitory computer-readable media storing computer-executable instructions that, when executed by the one or more processors, cause the one or more processors to perform operations of:
configuring the edge router to join a first multicast group associated with the communication provider network such that one or more media servers delivers a first plurality of media streams to the edge router via the communication provider network and the edge router delivers the first plurality of media streams to a plurality of media streamlining playback devices;
receiving an indication of characteristics associated with the plurality of media streaming playback devices;
determining, based at least in part on the characteristics, a second multicast group from which a media streaming playback device of the plurality of media streaming playback devices is likely to request content; and
based at least in part on the media streaming playback device being likely to request content from the second multicast group configuring the edge router to join the second multicast group such that the one or more media servers deliver an additional media stream to the edge router via the communication provider network.

10. The edge router of claim 9, wherein:
the indication of characteristics associated with the plurality of media streaming playback devices includes an indication of a second plurality of media streams, wherein the second plurality of media streams have been requested in the past by media streaming playback devices coupled to the edge router.

11. The edge router of claim 9, wherein:
the indication of characteristics associated with the plurality of media streaming playback devices includes at least one of an indication of at least one of geography associated with the edge router and an indication of demographic characteristics of users of the plurality of media streaming playback devices.

12. The edge router of claim 9, wherein:
configuring the first multicast join for the edge router to the communication provider network is further based at least in part on an indication of programming to be provided by the one or more media servers.

13. The edge router of claim 9, wherein:
configuring the first multicast join for the edge router to the communication provider network is further based at least in part on an indication of a time and/or data associated with the first multicast join.

14. The edge router of claim 9, wherein:
configuring the first multicast join includes processing the indication of characteristics associated with the plurality of media streaming playback devices in view of previous media stream requests originating from the plurality of media streaming playback devices.

15. One or more non-transitory computer-readable storage media storing computer-readable instructions that, when executed, instruct one or more processors to perform operations to couple an edge router of a communication provider network for communication with a plurality of media streaming playback devices, the operations comprising:
configuring the edge router to join a first multicast group associated with the communication provider network such that one or more media servers delivers a first plurality of media streams to the edge router via the communication provider network and the edge router delivers the first plurality of media streams to a plurality of media streamlining playback devices;
receiving an indication of characteristics associated with the plurality of media streaming playback devices;
determining, based at least in part on the characteristics, a second multicast group from which a media streaming playback device of the plurality of media streaming playback devices is likely to request content; and
based at least in part on the media streaming playback device being likely to request content from the second multicast group configuring the edge router to join the second multicast group such that the one or more media servers deliver an additional media stream to the edge router via the communication provider network.

16. The one or more non-transitory computer-readable storage media of claim 15, wherein:
the indication of characteristics associated with the plurality of media streaming playback devices includes an indication of a second plurality of media streams, wherein the second plurality of media streams have been requested in the past by media streaming playback devices coupled to the edge router.

17. The one or more non-transitory computer-readable storage media of claim 15, wherein:
the indication of characteristics associated with the plurality of media streaming playback devices includes at least one of an indication of at least one of geography associated with the edge router and an indication of demographic characteristics of users of the plurality of media streaming playback devices.

18. The one or more non-transitory computer-readable storage media of claim 15, wherein:
configuring the first multicast join for the edge router to the communication provider network is further based at least in part on an indication of programming to be provided by the one or more media servers.

19. The one or more non-transitory computer-readable storage media of claim 15, wherein:
configuring the first multicast join for the edge router to the communication provider network is further based at least in part on an indication of a time and/or data associated with the first multicast join.

20. The one or more non-transitory computer-readable storage media of claim 15, wherein:
configuring the first multicast join includes processing the indication of characteristics associated with the plurality of media streaming playback devices in view of previous media stream requests originating from the plurality of media streaming playback devices.

* * * * *